(No Model.)
C. BUSS.
GAGE FOR CUTTER HEAD KNIVES.
No. 273,022. Patented Feb. 27, 1883.
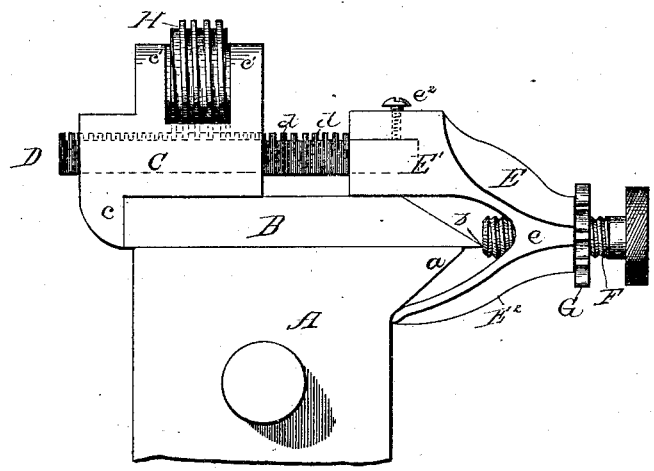
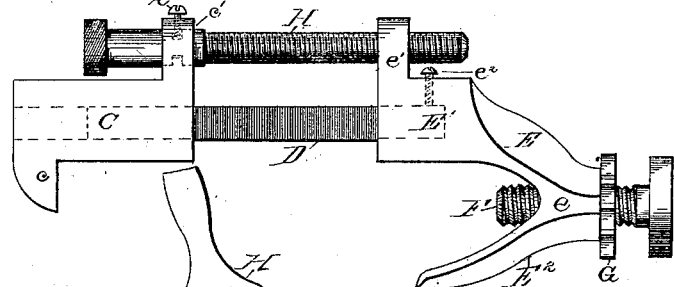
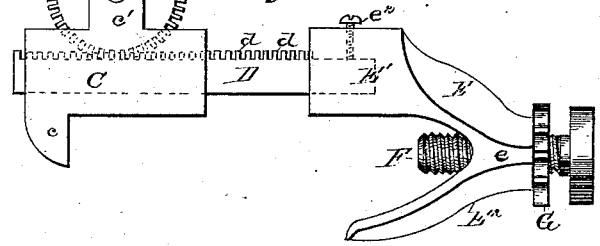
Witnesses:
C. B. Story.
E. G. Amus
Inventor:
Charles Buss
By
Stont & Underwood
Attorneys.

UNITED STATES PATENT OFFICE.

CHARLES BUSS, OF GRAND RAPIDS, MICHIGAN.

GAGE FOR CUTTER-HEAD KNIVES.

SPECIFICATION forming part of Letters Patent No. 273,022, dated February 27, 1883.

Application filed December 12, 1882. (No model.)

*To all whom it may concern:*

Be it known that I, CHARLES BUSS, of Grand Rapids, in the county of Kent, and in the State of Michigan, have invented certain new and useful Improvements in Devices for Setting Planer-Knives on Cylinder-Planers; and I do hereby declare that the following is a full, clear, and exact description thereof.

My invention relates to devices for setting planer-knives on cylinder-planers; and it consists in a gage of novel construction, as will be more fully set forth hereinafter.

In the drawings, Figure 1 is an elevation of my device in position for use, showing also a planer-knife and part of a planer-head. Figs. 2 and 3 are similar views of modified constructions of my gage.

A represents the head of a cylinder-planer, and B a planer-knife laid thereon, to be brought into proper position by means of my gage, which consists, primarily, of four parts—the dog C, rack or rod D, head E, and screw F. The dog is provided with a heel, c, of a depth substantially equivalent to the thickness of a planer-knife, and is perforated longitudinally to receive the square rod or rack D, and has a lug or lugs to receive the worm-wheel, screw, cam, lever, or other actuating-power, as hereinafter described. The head E has a square portion, E', the bottom of which is on a line with the lower part of the dog proper, and, like it, adapted to rest on the planer-knife, and this part is also perforated to receive the other end of the square rod or rack D. This head E is bifurcated, and the lower part, E², which is shorter than the upper part, extends downward, so as to bear against the upper beveled portion, a, of the planer-head, while the central portion or stem, e, of the forked head is perforated to receive the screw F, whose end is adapted to bear against the point b of the planer-knife B, as shown in Fig. 1, while G designates a jam-nut for the purpose of preventing any accidental turning of the screw F after it has been adjusted to place.

In the several figures of my drawings I have shown a variety of means for causing the dog C and head E to be moved toward or from each other. In Figs. 1 and 3 I have provided the rod D with teeth $d\,d$, and in the first figure I have shown a worm, H, journaled between lugs $c'\,c'$ of the said dog, and by turning the worm one way or the other the said dog will approach or recede from the head E. In Fig. 3 I have placed the lugs $c'\,c'$ parallel with the dog C, and journaled a segment (also marked H) between them, having a handle attached, and provided with teeth which mesh with the teeth $d\,d$ for the same purpose, while in Fig. 2 I have shown the rod D without teeth, and have shown a single lug, $c'$, upon the dog C, and a corresponding lug, $e'$, upon the head E, and connected these two lugs by means of a screw-bolt, (also marked H,) which serves exactly the same purpose as is effected by the worm and segment of the other figures. The smooth end of this bolt, which passes through a plain round perforation in the lug $c'$, is channeled to receive the lower end of a set-screw, $h$, so as to permit the revolution of the screw, and yet keep it in place with respect to the dog, while the perforation in the lug $e'$ is screw-threaded to receive the screw-threaded end of the bolt H to render it operative. In this form of my device the part D might be dispensed with, but I prefer to employ it; and I may vary my actuating mechanism H in a number of ways, obvious to the mechanic, without departing from the spirit of my invention. The end of the rod or rack D which enters the head E is secured thereto by set-screw $e^2$.

Heretofore the proper setting of planer-knives has involved considerable labor and loss of time, besides being a matter of difficulty; but with my device it becomes exceedingly simple. The knife is placed on the planer-head and the gage placed over it, with the lower arm, E², of the forked head resting against the beveled front upper portion of the said head. Then by turning the thumb-screw F in or out the distance to which the blade of the knife is desired to project beyond the edge of the planer-head is determined, and the jam-nut G is turned close to the head E to prevent accidental turning of the screw F, and next the worm, screw, or segments H are turned until the heel $c$ of the dog C is brought up against the rear edge of the knife B, and then a further turn of the part H will force the said knife forward until its cutting-edge $b$ touches the screw F. When this has been done the dog may be loosened sufficiently to enable the gage to be removed and placed over the knife at the opposite end of the planer-head, and then, having first seen that the arm E² is against the bevel or upper portion of the planer-head and that the parts E' and C are resting on the knife, the part H is again turned till the point of the knife is brought up against the end of the screw F, as before, when the planer-knife may be secured in the desired position by ordinary bolts and nuts, such as are commonly employed. Inasmuch as the adjustment is always a matter of the distance between the ends of the parts E² and F, and as the jam-nut G prevents the screw F from turning after it has been once set, it is obvious that my device will always work accurately, the dog C having no part in the adjusting, and only serving to bring the knife to place in the manner described, and hence the part H can be freely turned and the dog C moved either way without disturbing the adjustment.

It will also be understood that I may make the parts E, E', and D integral, if desired, thus dispensing with the screws $e^2$; but I prefer, ordinarily, to make them separately and unite them, as shown.

Having thus described my invention, what I claim as new, and desire to secure by Letters Patent, is—

1. The described gage, consisting of a dog provided with a heel adapted to bear against the rear edge of a planer-knife, and connected to a head having an arm adapted to pass the knife and bear against a planer-head and carrying an adjustable screw, adapted to limit the forward movement of the said knife, and means, substantially as described, for increasing or diminishing the distance between the dog and head, and hence to adjust the position of the knife upon the planer-head to any projection required, substantially as set forth.

2. The combination of the dog C, head E, having arm E², adapted to pass a planer-knife, screw F, jam-nut G, and means for connecting and actuating the dog and head, all arranged substantially as set forth.

3. The combination of the dog C, with heel c, the head E, with arm E², screw F, jam-nut G, rod or rack D, and actuating mechanism H, all arranged substantially as set forth.

In testimony that I claim the foregoing I have hereunto set my hand, on this 1st day of December, 1882, in the presence of two witnesses.

CHARLES BUSS.

Witnesses:
EDWARD TAGGART,
FRED W. STEVENS.